United States Patent
Snell et al.

(10) Patent No.: US 7,895,818 B2
(45) Date of Patent: Mar. 1, 2011

(54) METHOD FOR DETECTING ICE INGESTION IN A GAS TURBINE ENGINE

(75) Inventors: Robert John Snell, Derby (GB); Steven Michael Anthony, Nottingham (GB); Stefania Mandirola, Derby (GB); Arthur Laurence Rowe, Derby (GB)

(73) Assignee: Rolls-Royce PLC, London (GB)

( * ) Notice: Subject to any disclaimer, the term of this patent is extended or adjusted under 35 U.S.C. 154(b) by 449 days.

(21) Appl. No.: 12/068,731

(22) Filed: Feb. 11, 2008

(65) Prior Publication Data
US 2008/0302081 A1  Dec. 11, 2008

(30) Foreign Application Priority Data
Mar. 7, 2007 (GB) ................... 0704348.2

(51) Int. Cl.
*F02G 3/00* (2006.01)
(52) U.S. Cl. .................... 60/39.092; 60/772; 73/112.01
(58) Field of Classification Search ............. 60/39.091, 60/39.092, 39.093, 223, 779; 73/112.01
See application file for complete search history.

(56) References Cited

U.S. PATENT DOCUMENTS

| | | | | |
|---|---|---|---|---|
| 2,980,896 A * | 4/1961 | Robertson et al. | ........... | 340/580 |
| 5,182,944 A * | 2/1993 | Brunnenkant | ............ | 73/112.01 |
| 5,471,831 A * | 12/1995 | Rowe | ........................... | 60/773 |
| 5,479,818 A * | 1/1996 | Walter et al. | ............. | 73/112.05 |
| 5,484,122 A * | 1/1996 | DeSalve | ................. | 244/134 B |
| 5,622,045 A | 4/1997 | Weimer et al. | | |
| 5,752,674 A * | 5/1998 | Mears et al. | ............ | 244/134 R |
| 6,205,771 B1 * | 3/2001 | Rowe | ........................ | 60/226.1 |
| 6,659,712 B2 * | 12/2003 | Brooks et al. | .................. | 415/1 |
| 7,007,485 B2 * | 3/2006 | Pashley et al. | ................ | 60/773 |
| 2005/0129498 A1 | 6/2005 | Brooks | | |

FOREIGN PATENT DOCUMENTS

| | | |
|---|---|---|
| EP | 0 844 377 A1 | 5/1998 |
| EP | 1 241 335 A1 | 9/2002 |
| EP | 1 312 766 A3 | 5/2003 |

\* cited by examiner

*Primary Examiner*—Michael Cuff
*Assistant Examiner*—Phutthiwat Wongwian
(74) *Attorney, Agent, or Firm*—Oliff & Berridge PLC

(57) ABSTRACT

A method of detecting an ice shedding event in a gas turbine engine, the engine having a rotor comprising a compressor drivingly connected via a shaft to a turbine; the method for detecting an ice shedding event comprising the steps of measuring the temperature at regular intervals and where a temperature drop of at least 20 degrees per second is recorded, producing a signal indicative of an ice shedding event and sending the signal to an indicator device. Advantageously, the engine may then be inspected for damage associated to an ice impact rather than other foreign object ingestion event or fuel flow irregularity. Alternatively, instead of temperature, pressure may be measured and a pressure drop of at least 20 kPa per second is indicative of an ice shedding event.

7 Claims, 1 Drawing Sheet

METHOD FOR DETECTING ICE INGESTION IN A GAS TURBINE ENGINE

Figure 1:
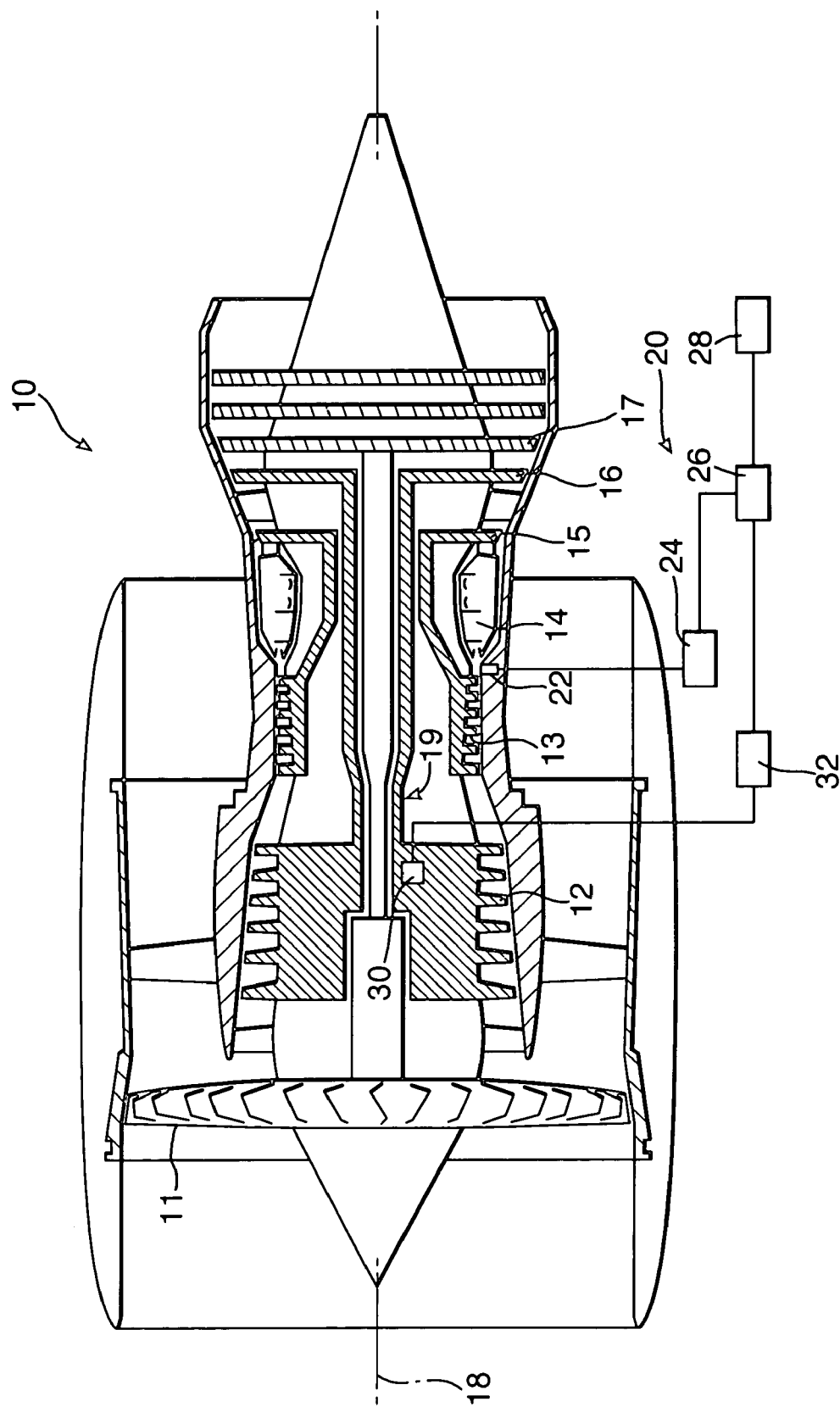

The present invention relates to apparatus and a method for detecting an ice ingestion event into a gas turbine engine.

Gas turbine engines and their associated aircraft are susceptible to ice build up and subsequently that ice may be ingested into the gas turbine engine. Ice can also build up on stationary parts of the engine's inlet, casings and stators, from where the ice may be shed suddenly. The ice can cause damage components, particularly compressor blades, in the gas turbine engine.

Therefore it is highly desirable to detect when ice is shed and passed into the gas turbine engine so that the engine may be inspected for damage before component failure.

US2005/0129498 discloses a device for detecting impacts on fan blade(s) by detecting either a change in fan blade twist or a transient drop in fan shaft speed using a speed probe(s). A significant impact is where the speed of rotation of the related shaft is reduced by more than 7% per second.

U.S. Pat. No. 5,622,045 discloses a damage detecting system which measures the speed of rotation N1 of a low pressure spool of a gas turbine engine and measures the speed of rotation N2 of a high pressure spool. A controller produces a synthesized, expected, speed of rotation N1 from the speed of rotation N2. The expected speed of rotation N1 is compared to the actual speed of rotation N1 to produce a damage error signal and a damage detection signal is produced if the damage error signal exceeds a threshold indicative of damage.

EP0844377 discloses a damage detection system that determines fan damage by comparing the power output of the fan and the low-pressure turbine. A control system measures the speed of rotation N1 of the fan and the total inlet temperature T20 to determine the power output of the fan. The power output of the low-pressure turbine is also determined. If damage is detected the thrust loss is recovered by adjusting the fuel flow.

Accordingly the present invention seeks to provide a novel method for detecting an ice shedding event for a gas turbine engine while operational.

The present invention provides a method of detecting an ice shedding event in a gas turbine engine, the engine having a rotor comprising a compressor drivingly connected via a shaft to a turbine; the method for detecting an ice shedding event comprising the steps of measuring the temperature or pressure at regular intervals and where a temperature or pressure drop of at least 20 degrees per second or 20 kPa per second respectively is recorded, producing a signal indicative of an ice shedding event and sending the signal to an indicator device.

Additionally, the method comprises confirming ice shedding with the further step of detecting a reduction in the speed of rotation of the rotor and producing at least one indicative speed signal.

Normally, a reduction in the speed of rotation of the rotor of greater than 1% per second is confirmation.

The present invention will be more fully described by way of example with reference to the accompanying drawings in which:—

FIG. 1 is a partially cut away view of a turbofan gas turbine engine having an apparatus for detecting an ice ingestion event according to the present invention.

With reference to FIG. 1, a ducted fan gas turbine engine generally indicated at 10 is of generally conventional configuration. It comprises, in axial flow series, a propulsive fan 11, intermediate and high pressure compressors 12 and 13 respectively, combustion equipment 14 and high, intermediate and low pressure turbines 15, 16 and 17 respectively. The high, intermediate and low pressure turbines 15, 16 and 17 are respectively drivingly connected to the high and intermediate pressure compressors 13 and 12 and the propulsive fan 11 by concentric shafts which extend along the longitudinal axis 18 of the engine 10. Although a three-shaft engine is described herein the present invention is equally applicable to engines having two shafts.

The engine 10 functions in the conventional manner whereby air compressed by the fan 11 is divided into two flows: the first and major part bypasses the engine to provide propulsive thrust and the second enters the intermediate pressure compressor 12. The intermediate pressure compressor 12 compresses the air further before it flows into the high-pressure compressor 13 where still further compression takes place. The compressed air is then directed into the combustion equipment 14 where it is mixed with fuel and the mixture is combusted. The resultant combustion products then expand through, and thereby drive, the high, intermediate and low-pressure turbines 15, 16 and 17. The working gas products are finally exhausted from the downstream end of the engine 10 to provide additional propulsive thrust.

In accordance with the present invention apparatus 20 for detecting an ice ingestion event comprises a sensor 22 mounted to a compressor 12, 13 and an electronic device 24 to convert the sensor 22 output to signal as input to a transient data analysis and recording unit 26. In a preferable arrangement the sensor 22 is a thermocouple mounted at a downstream part of the high-pressure compressor (T30) 13 and data is analysed and recorded at a rate of once per second by the latter unit. Alternatively, the sensor 22 may sense the pressure change in the compressor 12, 13 which is directly related to the temperature.

In addition to temperature or pressure readings, the apparatus 20 for detecting an ice ingestion event further comprises a speed sensor 30 and associated conditioning unit 32 arranged to measure the speed of rotation of one or more shafts 19 and to produce speed signals. The shaft or spool 19 speeds are known as N1, N2 and N3 for the low pressure, the intermediate pressure and high-pressure spool rotational speed respectively.

Typically, in the event of ice ingestion, values for parameter drops in one second are 40° C. at T30, and 2% N2 and 3% N3. A temperature (or respective pressure) drop less than 20° C. per second and/or rotational speed changes of shafts 19 less than 1% per second N2 and 1% per second N3 are indicative of either an ice ingestion event too small to cause damage or are within the normal operational conditions of the engine. A rapid temperature drop greater than 20° C. on T30 is more than is possible from a normal operational gas temperature change and therefore either solid and/or liquid at a lower temperature must be involved to get the required heat transfer rate. Hence this indicates a sudden amount of ice, water or a combination of water and ice passing through the compressor 12, 13, due to ice shedding off an upstream component of the engine or aircraft for example. It should be appreciated that fuel flow during the period does not drop, indicating that the parameter reductions are not due to a commanded or uncommanded engine manoeuvre. In the Applicant's experience the speed changes are more rapid than that which can be commanded, or experienced during engine surge, etc so fuel flow measurement is not essential to the invention, although where fuel flow did change it could be used as an indicator to rule out an ingestion event in service.

It should be appreciated that more than one temperature or pressure sensor 22 may be used and readings may be analysed and recorded over a different time period, but that remain typically within the range of once per tenth of a second to five seconds.

Due to measurement limitations, the step changes in parameters may not exactly coincide, our analysis allows for a stagger in the parameter drops of a few seconds either side of the T30 drop and the data analysis unit will still judge that an ice shedding event has occurred.

The present invention may be realised using temperature or pressure measurements in other parts of the gas stream e.g. anywhere within a compressor 12, 13 or use the engine's maximum turbine gas temperature (TGT) or engine gas temperature (EGT) measurements. The TGT or EGT is an industry standard temperature measurement in gas turbines and its usual use is for providing a maximum allowable turbine temperature.

The sensor 30 for rotation speed is a phonic wheel and a variable reluctance motor; however, other suitable means for measuring the speed of rotation of the rotor may be used.

The present invention is particularly related to a method of detecting an ice ingestion event in the gas turbine engine 10, comprising the steps of measuring the temperature and/or pressure at regular intervals and where a temperature drop of at least 20 degrees is recorded, producing a signal indicative of an ingestion event and sending the signal to an indicator device 28. When the indicator device 28 is triggered the engine is inspected for damage.

Where pressure (P30) is recorded instead of temperature, typically there is pressure drop of 35 kPa in one second and a drop of more than 20 kPa in one second is indicative of ice shedding.

The method of detecting an ice ingestion event in accordance with the present invention may further comprise confirming that the temperature and/or pressure drop is an ice ingestion event by carrying out the further step of detecting a reduction in the speed of rotation of the rotor/shaft 19 and producing at least one indicative speed signal for comparison with the temperature and/or pressure drop indication. In particular, a reduction in the speed of rotation of the rotor greater than 1% per second is indicative of an ingestion event.

The present invention is advantageous over current engine health monitoring methods as it is capable of immediately detecting an ice ingestion event and providing a warning for an operator to inspect for possible impact damage, thereby potentially leading to increased safety and reduced disruption in service. Furthermore, as ice ingestion is detected directly, rather than inferred from an engine health monitoring scheme that analyses parameter trend changes through subsequent flights, this method is capable of detecting ice ingestion events not detected by existing engine health monitoring methods. Thus the present invention is capable of detecting ice ingestion events that have little or no steady state performance effect, but may have significant mechanical effects through rotor crack initiation and subsequent blade fatigue failure, allowing preventative action to be taken. Advantageously, the present invention indicates when the engine should be inspected for damage associated to an ice impact rather than other foreign object ingestion event or fuel flow irregularity.

We claim:

1. A method of detecting an ice shedding event in a gas turbine engine, the engine having a rotor comprising a compressor drivingly connected via a shaft to a turbine; the method for detecting an ice shedding event comprising the steps of measuring a temperature or pressure at regular time intervals of the compressor or at a location downstream of the compressor and where a temperature or pressure drop of at least 20 degrees centigrade per second or 20 kPa per second respectively is recorded, producing a signal indicative of an ice shedding event and sending the signal to an indicator device.

2. A method of detecting an ice shedding event as claimed in claim 1 comprising confirming ice shedding with the further step of detecting a reduction in the speed of rotation of the rotor and producing at least one indicative speed signal.

3. A method of detecting an ice shedding event as claimed in claim 2 comprising the reduction in the speed of rotation of the rotor of greater than 1% per second.

4. The method of detecting the ice shedding event according to claim 1, the method further comprising:
    confirming ice shedding by measuring fuel flow, and under the condition that fuel flow did not change, confirming the ice shedding event.

5. The method of detecting the ice shedding event according to claim 1, wherein the temperature or pressure measured is that of a gas stream.

6. The method of detecting the ice shedding event according to claim 1, wherein the step of measuring the temperature or pressure is performed by a thermocouple, and temperature is measured.

7. The method of detecting the ice shedding event according to claim 6, wherein the thermocouple is located downstream of the compressor.

* * * * *